(12) United States Patent
Sugio et al.

(10) Patent No.: US 7,589,135 B2
(45) Date of Patent: Sep. 15, 2009

(54) PUNCTURE SEALING AGENT

(75) Inventors: Daisuke Sugio, Kodaira (JP); Ryuji Izumoto, Kodaira (JP); Kazuma Nakazawa, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 277 days.

(21) Appl. No.: 10/582,004

(22) PCT Filed: Dec. 6, 2004

(86) PCT No.: PCT/JP2004/018130

§ 371 (c)(1),
(2), (4) Date: Jun. 7, 2006

(87) PCT Pub. No.: WO2005/056710

PCT Pub. Date: Jun. 23, 2005

(65) Prior Publication Data

US 2007/0149653 A1  Jun. 28, 2007

(30) Foreign Application Priority Data

Dec. 8, 2003  (JP) .............................. 2003-408755

(51) Int. Cl.
*B29C 73/02* (2006.01)
*B60C 19/00* (2006.01)
(52) U.S. Cl. ....................... 523/334; 524/445; 524/515; 516/77

(58) Field of Classification Search ................... 516/77; 523/334; 524/515
See application file for complete search history.

(56) References Cited

U.S. PATENT DOCUMENTS

| 4,201,308 | A | * | 5/1980 | Neumann | .................... 220/614 |
| 2002/0077391 | A1 | * | 6/2002 | McInnes | ....................... 524/13 |
| 2002/0110686 | A1 | * | 8/2002 | Dugan | ........................ 428/364 |

FOREIGN PATENT DOCUMENTS

| CN | 1069929 A | | 3/1993 |
| JP | 49-6321 B | | 2/1974 |
| JP | 61-14277 A | | 1/1986 |
| JP | 10-096171 | * | 4/1998 |
| JP | 11-350240 | * | 12/1999 |
| JP | 2000-104042 A | | 4/2000 |
| JP | 2001-62934 A | | 3/2001 |
| JP | 2001062934 | * | 3/2001 |

* cited by examiner

*Primary Examiner*—Ling-Siu Choi
*Assistant Examiner*—Chun-Cheng Wang
(74) *Attorney, Agent, or Firm*—Sughrue Mion, PLLC (57) ABSTRACT

A puncture sealing agent includes at least a rubber latex solution, a short fiber and a clay base viscosity improver, the viscosity of the rubber latex solution after addition of the clay base viscosity improver being 3 to 6000 mPa·s in a range of +50 to −20° C.

13 Claims, 5 Drawing Sheets

PUNCTURE SEALING AGENT

BACKGROUND OF THE INVENTION

1. Technical Field

The invention relates to a puncture sealing agent that is used to seal a punctured tire.

2. Background Art

Various kinds of puncture sealing agents are known as a repairing material that seals a punctured portion, when a puncture hole is caused (for instance, Japanese Patent No. 3210863). In existing puncture sealing agents, mainly, (1) propylene glycol or ethylene glycol as an anti-freezing agent, (2) an additive such as fibers or rubber powder for improving the sealing property and (3) a viscosity improver such as methyl cellulose that suppresses the additive from sedimenting and thereby controls the injecting property are blended in a latex such as NR (natural rubber), NBR (nitrile rubber), SBR (styrene butadiene rubber) or carboxyl-modified NBR.

The additives are different in specific gravity from each other; accordingly, when a third component such as a viscosity improver is added to a latex, the latex flocculates and separates during storage in a vehicle or the like, and furthermore, the separated component (latex and the like) may gelate.

It is thought that this is because (1) when a viscosity improver made of an aqueous polymer such as methyl cellulose or carboxylmethyl cellulose is used, the latex flocculates to form particles of 1 to 100 μm, and (2) a grown particle separates owing to a difference in specific gravity from its surroundings (according to a sedimentation theory described with a formula below, the larger the particle diameter is, the faster the sedimentation (separation) velocity is).

$$v = \frac{2(\rho - \rho_0)a^2}{9\eta_A} g \qquad \text{[formula 1]}$$

a: particle diameter, v: sedimentation velocity,
ρ: specific gravity of a particle, $\rho_0$: specific gravity, and
$\eta_A$: viscosity coefficient Namely, it can be said that hardly any effective research has been carried out regarding a puncture sealing agent that can be stably used without causing separation even after long storage while maintaining excellent characteristics such as the puncture hole sealing property and injection stability.

DISCLOSURE OF THE INVENTION

Problems to be Solved by the Invention

In view of the above, the invention intends to overcome the foregoing existing problems. Namely, the invention intends to provide a puncture sealing agent that does not cause deterioration of performance, such as separation, even after long period storage and is excellent in the puncture hole sealing property.

Means for Solving the Problems

The inventors studied hard to achieve the object and found that the object can be achieved with the invention below.

The invention relates to a puncture sealing agent that includes at least a rubber latex solution, a short fiber and a clay base viscosity improver and the viscosity of the rubber latex solution after addition of the clay base viscosity improver is from 3 to 6000 mPa·s in the range of +50 to −20° C.

To the puncture sealing agent according to the invention, at least one of the aspects below can be preferably applied.

(1) According to a first aspect, the content of a solid component is 5 to 70 mass percent and the content of the short fiber is 0.1 to 5 mass percent.

(2) According to a second aspect, the length (L) and the diameter (D) of the short fiber, respectively, are in the ranges below:
Length (L): 0.05≦L≦10 mm and
Diameter (D): 1≦D≦100 μm.

(3) According to a third aspect, a ratio (L/D) of the length (L) to the diameter (D) of the short fiber is in the range of 5≦L/D≦2000.

(4) According to a fourth aspect, the short fiber is obtained by compositing an inorganic filler with a material that is lower in specific gravity than the rubber latex solution.

(5) According to a fifth aspect, the short fiber is made of a porous material that is higher in specific gravity than the rubber latex solution.

(6) According to a sixth aspect, the short fiber is obtained by compositing a material lower in specific gravity than the rubber latex solution and a material higher in the specific gravity than the rubber latex solution.

(7) According to a seventh aspect, in the sixth aspect, the short fiber has a multi-layered structure and the outermost layer thereof is made of a material higher in specific gravity than the rubber latex solution.

Effect of the Invention

According to the invention, a puncture sealing agent that does not cause deterioration of performance, such as the separation, even after long period storage and is excellent in the puncture hole sealing property (in particular, easiness of injection) can be provided.

BEST MODE FOR CARRYING OUT THE INVENTION

A puncture sealing agent according to the invention includes at least a rubber latex solution, a short fiber and a clay base viscosity improver.

In the specification, "a rubber latex solution" is a suspension where particles of a rubber polymer are dispersed and refers to a puncture sealing agent from which the short fiber is removed. For instance, when a puncture sealing agent according to the invention is composed of a short fiber, rubber latex, a non-freezing solution and a viscosity improver, the rubber latex solution means a mixture of the rubber latex, the non-freezing solution and the viscosity improver.

(Clay Base Viscosity Improver)

The clay base viscosity improver is contained to control the viscosity of the rubber latex solution in an appropriate range. In the clay base viscosity improver that uses a clay mineral such as smectite, smectite thin flakes are hydrated and weakly charged "+" at an edge portion and weakly charged "−" on a surface thereof. Owing to the charge, smectite takes on a space structure to increase the viscosity. Because of the viscosity increase according to such a mechanism, the latex does not flocculate.

On the contrary, in the existing viscosity improvement technology that uses an aqueous polymer such as methyl cellulose, in many cases, the aqueous polymer interacts with the latex to form particles having a particle diameter of 1 μm to result in increasing the viscosity.

As the clay base viscosity improver, other than smectite (including montmorillonite (bentonite)), attapulgite and kaolin and furthermore clay modified with an organic material such as organic bentonite clay that is obtained by reacting smectite with a quaternary ammonium organic compound can be cited. A viscosity improver can be selected according to the applications thereof considering features of the respective minerals, crystal structures and particle diameters.

Furthermore, in the viscosity improver that includes an aqueous polymer such as methyl cellulose that is conventionally used, generally the latex is flocculated to form particles of 1 μm or more.

In the present invention, a clay base viscosity improver is used that is a clay mineral (clay containing aluminum magnesium silicate or hydrogen aluminum sodium silicate) such as smectite. When the clay base viscosity improver is used, the viscosity can be controlled without flocculating the latex into particles having a particle diameter of 1 μm or more. Furthermore, when the particle diameter is suppressed to as small as 1 μm or less, the separation velocity can be lowered and thereby separation can be suppressed.

The viscosity of the latex solution to which the clay base viscosity improver is added is set to be 3 to 6000 mPa·s in the temperature range of +50 to −20° C. When the viscosity is lower than 3 mPa·s, an additive (additive agent) cannot be sufficiently suppressed from sedimenting and a predetermined amount of the additive cannot be injected (additive alone remains in a vessel). Furthermore, when the viscosity is as high as 6000 mPa·s or more, the resistance to injection becomes larger to deteriorate the injecting property and the latex solution expands insufficiently to an internal surface of a tire to result in failing to obtain high sealing property.

A concentration of the clay base viscosity improver to obtain viscosity of 3 to 6000 mPa·s at +50 to −20° C. is appropriately selected so that the predetermined viscosity may be obtained in accordance with the rubber latex solution used.

The viscosity of the latex solution to which the clay base viscosity improver is added can be measured with, for instance, a BL type viscometer (measuring with a stirrer BL3).

Furthermore, the content of the solid component in a puncture sealing agent according to the invention is preferably 5 to 70 mass percent.

The "content of the solid component" can be obtained as follows. First, 100 g of the puncture sealing agent is left for 30 min at 200° C. The mass of residue after being left thus is measured followed by dividing the mass of the residue with the mass of the puncture sealing agent (mass of the residue/mass of the puncture sealing agent before being left), and thereby the content of the solid component can be obtained.

When the content of the solid component is less than 5 mass percent, the ratio of the rubber latex becomes low and thereby sufficient sealing property may not be secured. Furthermore, when the content of the solid component exceeds 70 mass percent, properties other than the sealing property may not be sufficiently secured.

The content of the solid component is preferably set to be 10 to 60 mass percent and more preferably 15 to 50 mass percent.

(Rubber Latex)

Various kinds of latexes can be used as the rubber latex. However, from the viewpoint of securing excellent sealing property, at least any one selected from the group consisting of an SBR latex, an NBR latex, a carboxyl-modified NBR latex and a carboxyl-modified SBR latex is preferably used.

(Short Fiber)

The short fiber enters into a hole (punctured portion) generated in a tire owing to the puncture, to cause clogging and thereby plays a role of speedily and assuredly clogging the hole. The content of the short fiber in the puncture sealing agent is preferably set to be 0.1 to 5 mass percent. When the content is less than 0.1 mass percent, the sealing property due to addition of the short fiber may not be sufficiently exerted. Furthermore, when the content exceeds 5 mass percent, entanglement of the short fibers is caused, thereby the viscosity increases to deteriorate the easiness of injection and the above-mentioned role cannot be sufficiently exerted, and the sealing property may also be deteriorated.

The content of the short fiber in the puncture sealing agent, while depending on the specific gravity thereof, is preferably set to be 0.3 to 4 mass percent and more preferably 0.5 to 3 mass percent.

As a material of the short fiber, although there is no particular restriction, polypropylene, polyester, polyethylene and nylon can be used.

The specific gravity of the rubber latex is 0.90 to 1.10. Since the specific gravity of water is 1.00 and that of the non-freezing solution is 1.03 to 1.12, the specific gravity of the rubber latex solution, in consideration of the contents thereof, is 1.00 to 1.08. On the other hand, since the specific gravity of the short fiber made of polyethylene is 0.95 and that of the short fiber of polypropylene is 0.9, these are likely to float in the rubber latex solution. Furthermore, since the specific gravity of the short fiber made of nylon is 1.14, the short fiber made of nylon is likely to submerge in the rubber latex solution. Accordingly, while considering the specific gravity of the rubber latex solution, the material of the short fiber can be preferably selected.

The material of the short fiber is preferably selected so that the specific gravity of the short fiber may be substantially the same as that of the rubber latex solution. Here, "substantially the same" means that a ratio (X/Y) of the specific gravity (X) of the short fiber to that (Y) of the rubber latex solution is in the range of 0.85 to 1.15. When the specific gravities thereof are made substantially the same, the short fibers can be prevented from sedimenting and flocculating, and thereby a state where the short fibers are dispersed can be excellently maintained. As a result, even after long storage, performance deterioration such as separation is not caused. Accordingly, a puncture sealing agent excellent in puncture sealing property can be obtained.

In view of obtaining excellent dispersibility in long storage, the ratio (X/Y) of the specific gravities is preferably 0.92 to 1.08 and more preferably 0.94 to 1.06.

Furthermore, the shape of the short fiber may be changed to control the dispersibility or the short fiber may be composited to render the specific gravity in a desired range to control the dispersibility. In view of practicality, the latter, where the short fiber is composited to control the dispersibility, is preferable.

Figure 1:
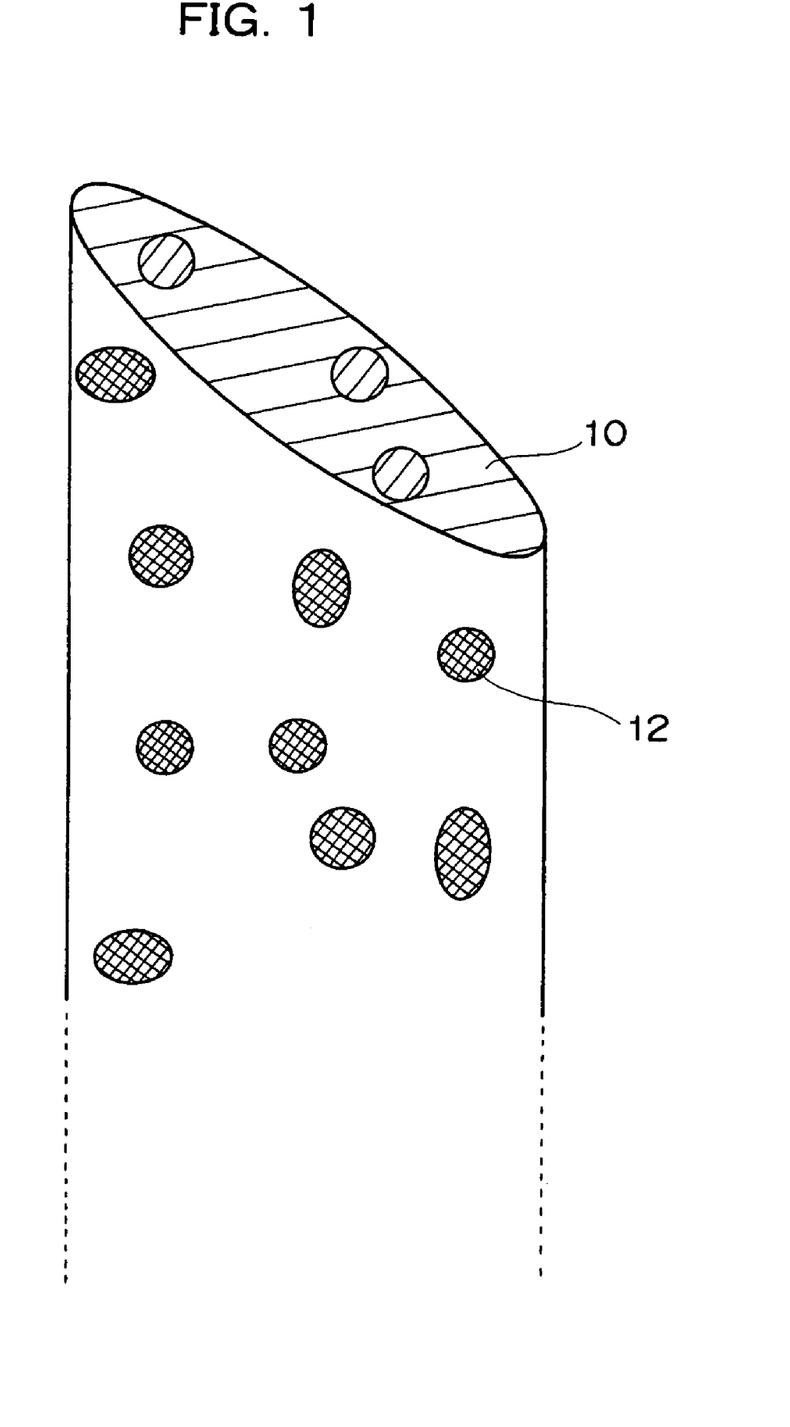
FIG. 1 is a partial sectional view showing a first example of a composited short fiber.

In FIGS. 1 through 5, partial sectional views of composited short fibers are shown. A short fiber shown in FIG. 1 is, for instance, an aspect where a short fiber such as polyethylene that is a material 10 that is smaller in specific gravity than the rubber latex solution is composited with a filler 12. By compositing the filler 12, the specific gravity can be made larger to be substantially the same as that of the rubber latex solution that is used.

As the material of the filler 12, particles of a metal such as Ti, an inorganic filler such as calcium carbonate and particles of a metal oxide can be cited.

As a method of compositing the short fiber with the filler 12, a method where, in the process of melting the fiber, a predetermined filler is dispersed followed by spinning can be applied.

Figure 2:
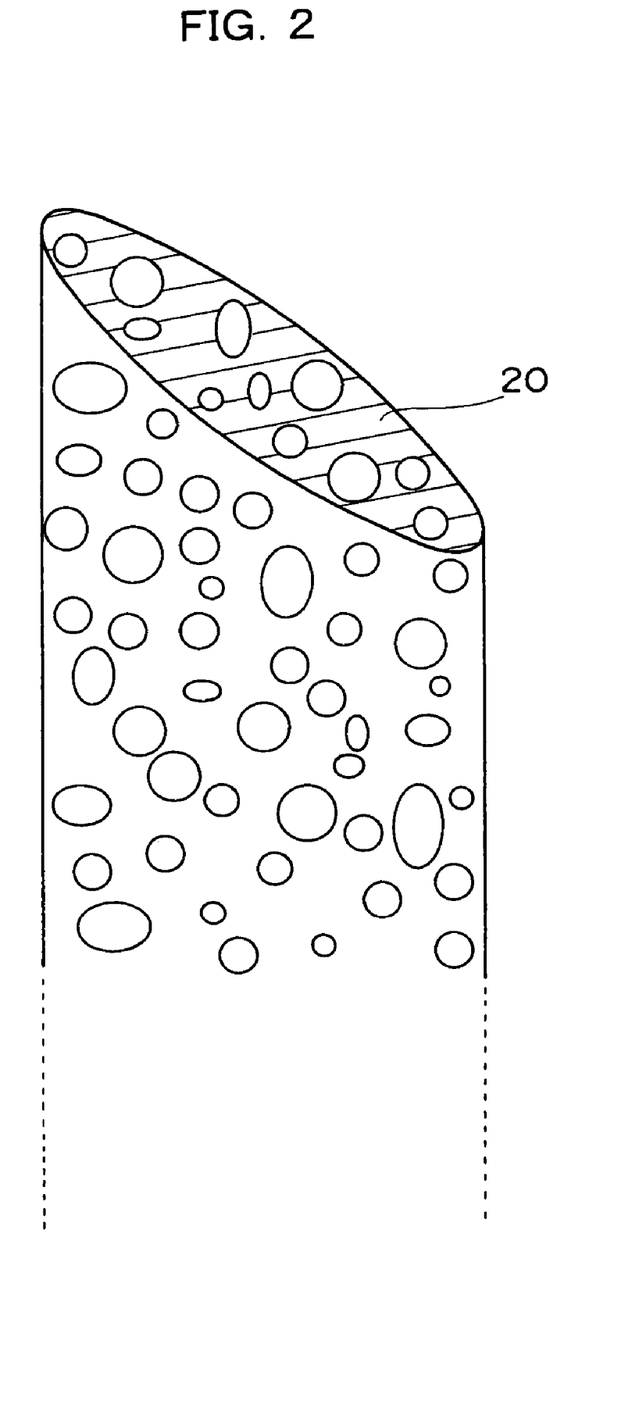
FIG. 2 is a partial sectional view showing a second example of a composited short fiber.

A short fiber shown in FIG. 2 is an aspect where a short fiber such as nylon that is a material 20 that is larger in specific gravity than the rubber latex solution is made porous by foaming. By making the short fiber porous, the specific gravity can be made substantially the same as that of the rubber latex solution that is used.

As a method of foaming, similarly to the above, a general method where the fiber material is blended with a foaming agent followed by spinning may be applied.

Figure 3:
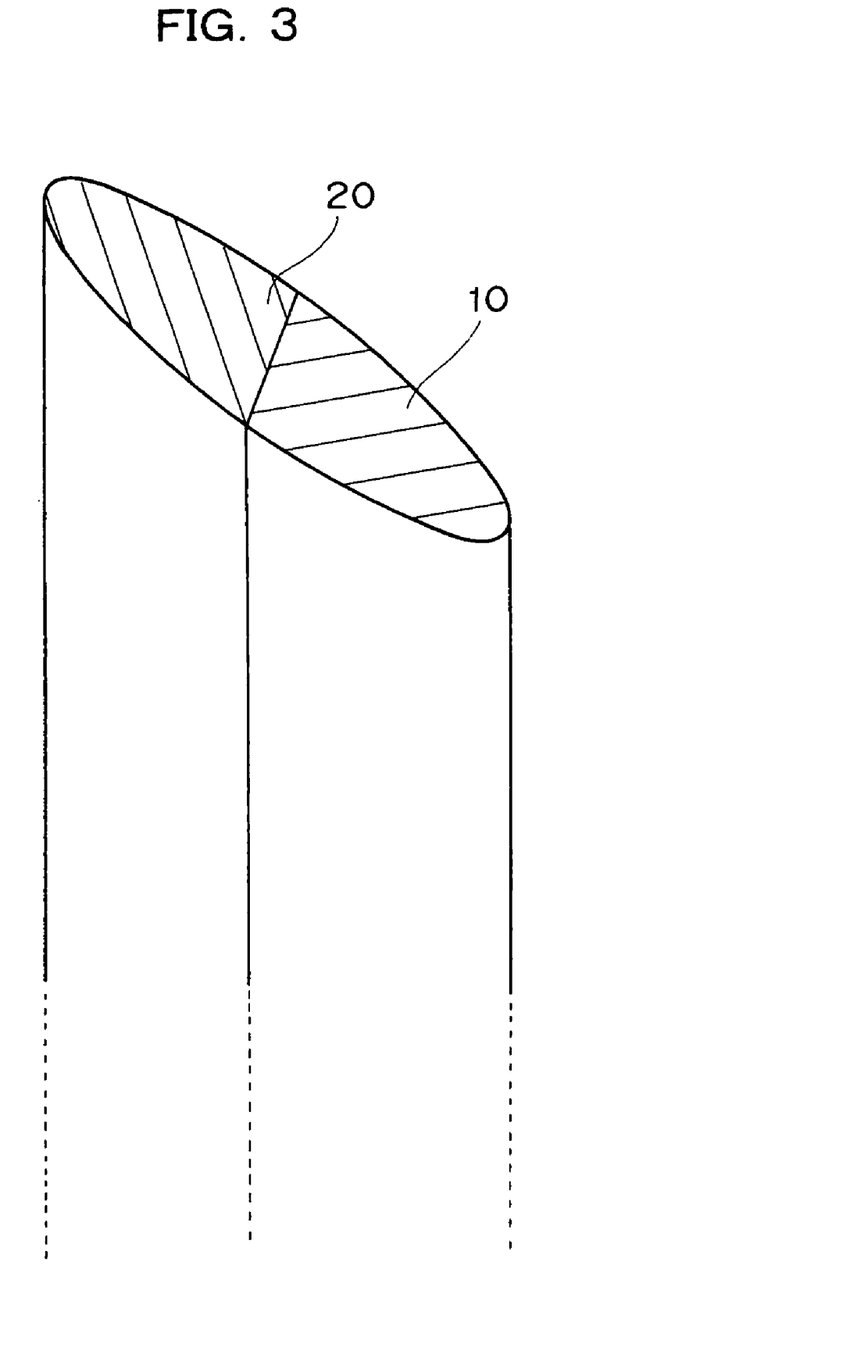
FIG. 3 is a partial sectional view showing a third example of a composited short fiber.

A fiber shown in FIG. 3 is an aspect where a short fiber such as nylon that is a material 20 that is high in specific gravity and a short fiber such as polyethylene that is a material 10 that is low in specific gravity are combined. When a material large in the specific gravity and a material small in specific gravity are combined, similarly to the aspects shown in FIGS. 1 and 2, the specific gravity can be made substantially the same as that of the rubber latex solution that is used.

Figure 4:
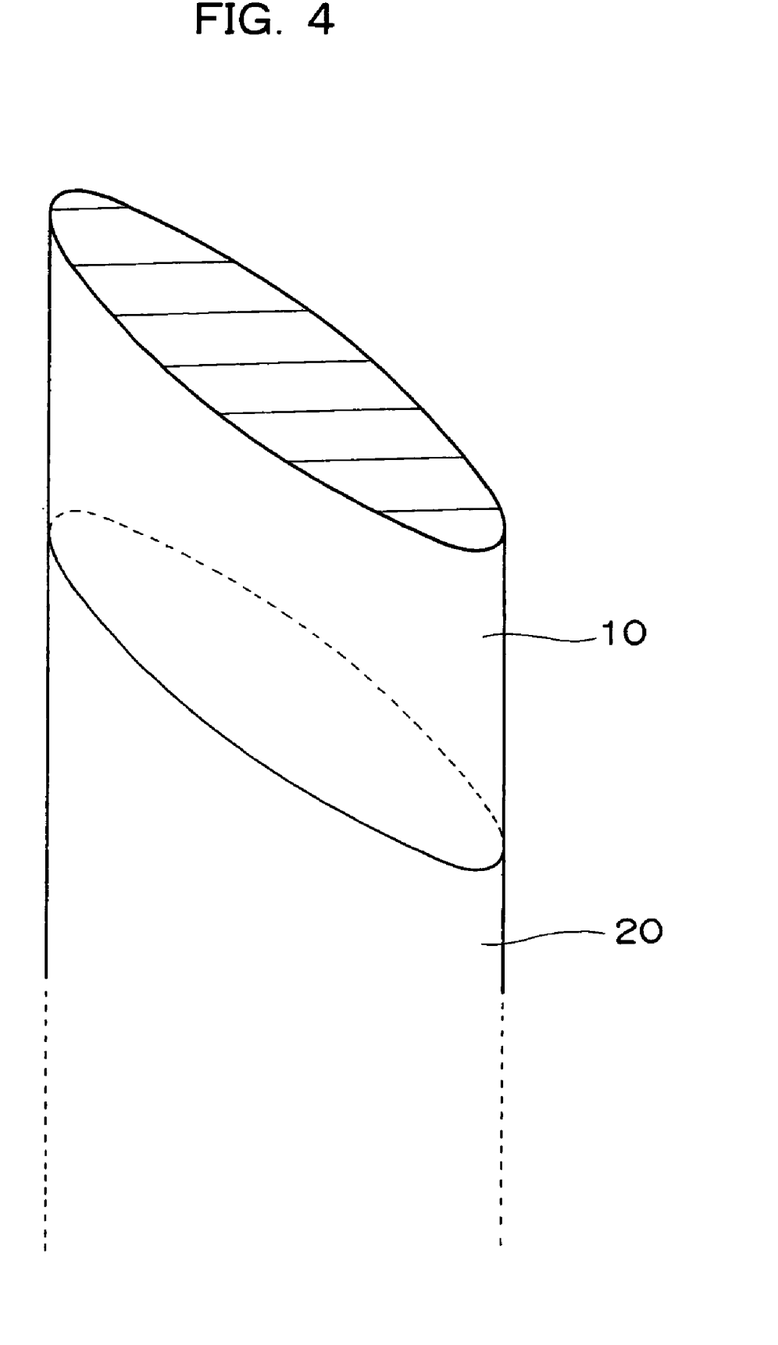
FIG. 4 is a partial sectional view showing a fourth example of a composited short fiber.
Figure 5:
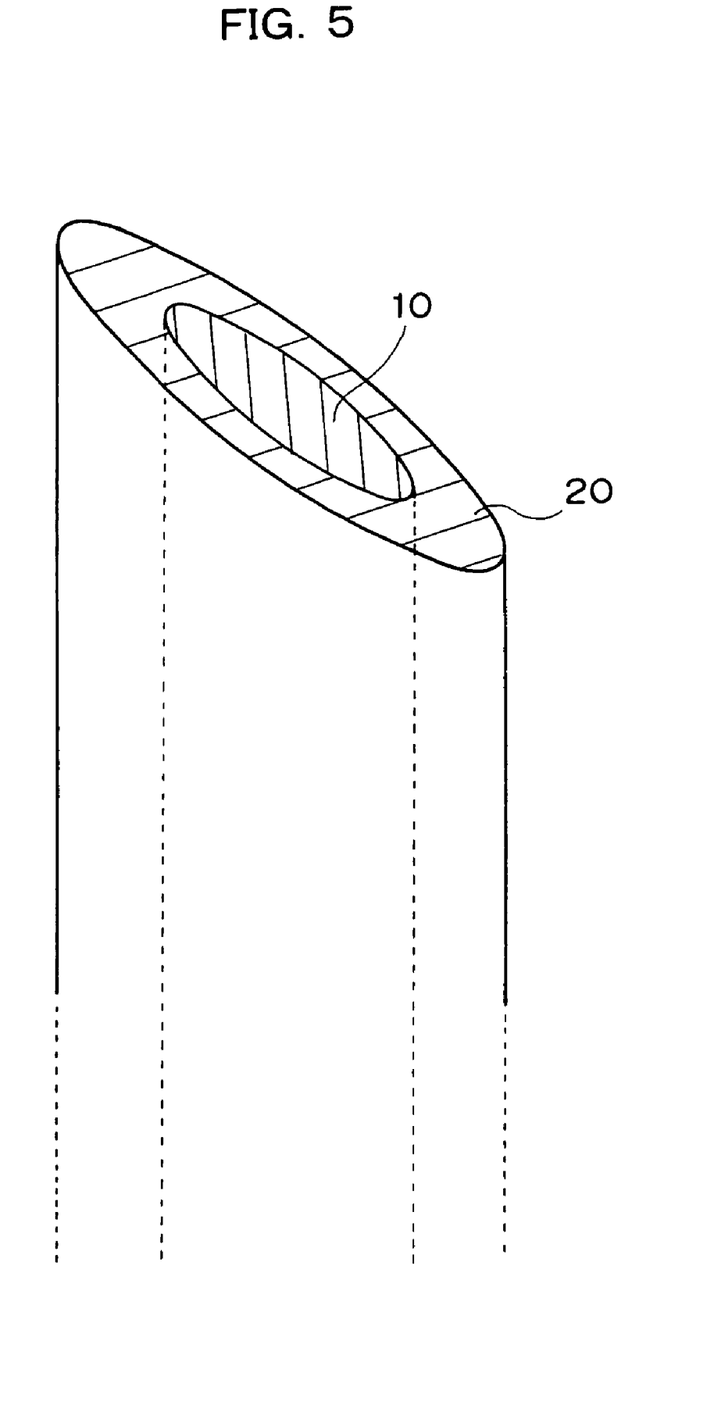
FIG. 5 is a partial sectional view showing a fifth example of a composited short fiber.

Furthermore, FIGS. 4 and 5 are aspects where, similarly to FIG. 3, a material high in specific gravity and a material low in specific gravity are combined. A short fiber shown in FIG. 4 is an aspect where an end portion of a material 10 that is low in specific gravity and an end portion of a material 20 that is high in specific gravity are adhered. A short fiber shown in FIG. 5 is a mode where a material 10 low in the specific gravity and a material 20 that is high in specific gravity form a multi-layered structure (core/sheath structure). In the aspect, a surface side is preferably made of a material 20 that is high in specific gravity such as. When a superficial side is made of a material 20 that is high in specific gravity such as nylon, which is high in hydrophilicity, the short fibers can be more uniformly dispersed in a solution and thereby it becomes difficult for a clot to be generated when short fibers entwine with each other during long storage becomes difficult to occur.

Aspects shown in FIGS. 1 through 5 are only examples. These may be variously modified and may be variously combined.

The ratio of a material low in specific gravity and a material high in specific gravity that are combined and the content of the filler are preferably appropriately adjusted depending on the specific gravity being controlled.

Furthermore, a material low in specific gravity and a material high in specific gravity, respectively, without compositing, may be blended at a predetermined mass ratio.

In order to allow the sealing property to be sufficiently exerted, the shape of the short fiber also needs to be variously designed. Here, a length (L), a diameter (D) and a ratio (L/D) of the length to the diameter of the short fiber, respectively, are preferably set in following ranges.

(1) Length (L): $0.05 \leq L \leq 10$ mm (more preferably $0.08 \leq L \leq 8$ mm and still more preferably $0.1 \leq L \leq 6$ mm).

When the length is less than 0.05 mm, the short fibers may be incapable of clogging a defect portion due to the puncture to sufficiently exert an effect of improving the sealing property. On the other hand, when it exceeds 10 mm, since the relative number of the short fibers decreases, the sealing property may be deteriorated.

(2) Diameter (D): $1 \leq D \leq 100$ μm (more preferably $3 \leq D \leq 80$ μm and still more preferably $5 \leq D \leq 50$ μm).

When the diameter is less than 1 μm, the short fibers may not sufficiently exert the role of the short fibers that clog to improve the sealing property by clogging. On the other hand, when it exceeds 100 μm, since the relative number of the short fibers decreases, the sealing property may be deteriorated.

(3) Ratio (L/D) of length to diameter: $5 \leq L/D \leq 2000$ (more preferably $20 \leq L/D \leq 1600$, still more preferably $50 \leq L/D \leq 1200$ and particularly preferably $100 \leq L/D \leq 300$).

When the L/D is less than 5, the short fibers may be incapable of generating clogging to sufficiently exert the role of the short fiber of improving the sealing property. On the other hand, when it exceeds 2000, a clot owing to the entanglement of the short fibers is generated; accordingly, the sealing property and the easiness of injection may be deteriorated.

As to the short fibers, all or a part thereof (preferably all) is preferably processed in advance with the solvent such as a higher alcohol derivative and/or a betaine base surfactant. Owing to such a process, a solvent works as an active agent to improve the dispersibility of the short fibers.

The process may be applied either before or after the short fibers are contained in the puncture sealing agent. As a method of processing thereof, the short fibers may be impregnated with the solvent or the solvent may be sprayed. As the higher alcohol derivative, polyglycol base polyester is preferable.

The amount of added solvent (the amount absorbed by the short fibers according to the process) is preferably 0.2 to 20 mass percent based on the mass of the short fibers, more preferably 0.5 to 10 mass percent and still more preferably 1 to 6 mass percent. When the amount of added solvent is too small, the short fibers may not be sufficiently dispersed, which would result in insufficient processing. On the other hand, when it is added excessively, no further improvement in the effect can be expected.

(Anti-freezing Agent)

The puncture sealing agent according to the invention preferably contains an anti-freezing agent. As the anti-freezing agent, without restricting to any particular one, ethylene glycol and propylene glycol can be used. The content of the anti-freezing agent in the puncture sealing agent is preferably 5 to 50 mass percent. When the content is less than 5 mass percent, the anti-freezing property at low temperatures may not be sufficiently obtained. On the other hand, when it exceeds 50 mass percent, the amount of glycol becomes excessive in relation to the amount of the rubber latex; accordingly, when a punctured portion is repaired, since particles of flocculated rubber latex are present dispersed in glycol, the sealing property may not be sufficiently obtained.

Furthermore, in the puncture sealing agent according to the invention, water can be contained to dilute the puncture sealing agent. Still furthermore, in the puncture sealing agent, an ordinary dispersant, emulsifier, foaming/stabilizing agent or pH adjusting agent such as ammonia or sodium hydroxide may be added. As a resinous adhesive, a terpene resin such as a terpenephenol resin can be used.

As a puncture repairing method with such a puncture sealing agent, a known method can be applied. Namely, first, a container in which the puncture sealing agent is filled is inserted in a valve inlet to inject an appropriate amount thereof. Thereafter, a tire may be rotated so that the puncture sealing agent may be uniform in the tire.

Furthermore, the puncture sealing agent according to the invention can be applied to repair the punctured portions of various kinds of air-filled tires. For instance, tires for automobiles, tires for bicycles, tires for unicycles, tires for wheel chairs and tires for vehicles that are used in farm and garden can be cited.

EXAMPLES

In the following, the invention will be more specifically described with reference to examples. However, the invention is not restricted to the examples.

Example 1

Materials shown in (1) through (5) below were mixed with a propeller mixer to prepare a puncture sealing agent. The viscosity of a rubber latex solution was 1000 mPa·s (measured with a stirrer BL3 under 60 rpm) at 20° C. and adjusted so as to be 3 to 6000 mPa·s in the temperature range of +50 to −20° C.

(1) Rubber latex: NBR base latex (trade name: NIPOL, manufactured by Nippon Zeon Co., Ltd.), content in the puncture sealing agent: 65 mass percent (2) Short fiber: Nylon fiber, content in the puncture sealing agent: 2 mass percent, length of the short fibers: 2 to 7 mm, diameter of short fibers: 5 to 30 μm (3) Anti-freezing solution: ethylene glycol, content in the puncture sealing agent: 25 mass percent (4) Viscosity improver: smectite clay, content in the puncture sealing agent: 2 mass percent (5) Other: water as a remnant The specific gravity of the short fibers and that of the puncture sealing agent (rubber latex solution) excluding the short fibers were measured by use of a specific gravity cup. The specific gravity of the rubber latex solution was 1.04 and that of the short fiber was as shown in Table 1 below.

Example 2

Except that the content of the viscosity improver was changed to 0.2 mass percent to render the viscosity of the rubber latex solution 3 mPa·s at +50° C., a puncture sealing agent was prepared similarly to Example 1.

Example 3

Except that the content of the viscosity improver was changed to 4.0 mass percent to render the viscosity of the rubber latex solution 6000 mPa·s at −20° C., a puncture sealing agent was prepared similarly to Example 1.

Example 4

Except that a short fiber (made of polyethylene, having dimension the same as example 1 and using Ti particles as filler) according to an aspect shown in FIG. 1 was used, a puncture sealing agent was prepared similarly to Example 1.

Example 5

Except that a short fiber according to an aspect shown in FIG. 2 was used, a puncture sealing agent was prepared similarly to Example 1.

Example 6

Except that a short fiber (polyethylene: nylon=57%: 47%) according to an aspect shown in FIG. 3 was used, a puncture sealing agent was prepared similarly to Example 1.

Comparative Example 1

Except that the content of the viscosity improver was changed to 0.1 mass percent to render the viscosity of the rubber latex solution 2 mPa·s at +50° C., a puncture sealing agent was prepared similarly to Example 1.

Comparative Example 2

Except that the content of the viscosity improver was changed to 4.1 mass percent to render the viscosity of the rubber latex solution 6300 mPa·s at −20° C., a puncture sealing agent was prepared similarly to Example 1.

Comparative Example 3

Except that methyl cellulose was used as the viscosity improver, a puncture sealing agent was prepared similarly to Example 1. The viscosity of the rubber latex solution was adjusted so as to be 400 mPa·s at +20° C. and, 3 to 6000 mPa·s in the temperature range of +50 to −20° C., similarly to Example 1.

Of the prepared puncture sealing agents, the dispersion state of fibers in long storage was observed. Specifically, 1000 ml of the puncture sealing agent was sampled and left for 1 month under room temperature. Thereafter, 100 ml was sampled from each of top portion/middle portion/bottom portion, and filtrated to recover the short fibers alone, followed by obtaining the dry weight of the short fibers, and thereby the concentration (mass percent) of the short fibers in each of the top portion/middle portion/bottom portion was obtained.

When the concentration of the short fibers in each of the top portion/middle portion/bottom portion is constant (when the concentration difference is within 1.3 mass percent), the dispersibility of the short fibers is excellent and when the concentration fluctuates the dispersibility is low. Results are shown in Table 1.

Furthermore, easiness of injection and long period storability were evaluated for the puncture sealing agents prepared according to Examples 1 through 6 and Comparative Examples 1 through 3, as shown below. Results are shown in Table 1.

TABLE 1

| | | Example 1 | Example 2 | Example 3 | Example 4 | Example 5 | Example 6 | Comparative Example 1 | Comparative Example 2 | Comparative Example 3 |
|---|---|---|---|---|---|---|---|---|---|---|
| Specific gravity of short fiber | | 1.14 | 1.14 | 1.14 | 1.04 | 1.04 | 1.04 | 1.14 | 1.14 | 1.14 |
| Concentration of short fiber (mass percent) | Top | 1.6 | 1.4 | 2.0 | 2.0 | 2.0 | 2.0 | 1.0 | 2.0 | 1.6 |
| | Middle | 2.0 | 2.1 | 2.0 | 2.0 | 2.0 | 2.0 | 2.2 | 2.0 | 2.0 |
| | Bottom | 2.4 | 2.6 | 2.0 | 2.0 | 2.0 | 2.0 | 2.8 | 2.0 | 2.4 |

TABLE 1-continued

| | Example 1 | Example 2 | Example 3 | Example 4 | Example 5 | Example 6 | Comparative Example 1 | Comparative Example 2 | Comparative Example 3 |
|---|---|---|---|---|---|---|---|---|---|
| Separation/gelation | None (Excellent) | None (Excellent) | None (Excellent) | None (Excellent) | None (Excellent) | None (Excellent) | None (Excellent) | None (Excellent) | Yes (Defect) |
| Easiness of Injection −20° C. | Excellent | Excellent | Excellent | Excellent | Excellent | Excellent | Excellent | Impossible to inject owing to low fluidity | Excellent |
| 20° C. | Excellent | Excellent | Excellent | Excellent | Excellent | Excellent | Excellent | Excellent | Excellent |
| 50° C. | Excellent | Excellent | Excellent | Excellent | Excellent | Excellent | Leftover short fiber | Excellent | Excellent |

(1) Easiness of Injection:

With a syringe of 100 ml, under temperature conditions of each of −20° C., +20° C. and +50° C., the prepared puncture sealing agent was injected from a valve. By comparing the injection time with that when a generally used puncture sealing agent is used, the easiness of injection was evaluated.

As to the puncture sealing agent according to Comparative Example 1, the short fibers remained in a container (in the syringe) at +50° C. Furthermore, the puncture sealing agent according to Comparative Example 2 could not be sufficiently injected at −20° C. because of low fluidity. By contrast, the puncture sealing agents according to Examples 1 through 6 all could be injected excellently without leaving the short fibers. Still furthermore, as to the easiness of injection, excellent results were obtained such that all the puncture sealing agents according to Examples 1 through 6 could be injected within an injection time substantially the same as that of generally used puncture sealing agent.

(2) Long Storability:

One liter of each of the puncture sealing agents was stored in an oven at 90° C. After storing under the above conditions for 6 months, whether separation/gelation of the latex occurred was visually observed.

While in the puncture sealing agents according to Examples 1 through 6 separation/gelation did not occur, in the puncture sealing agent according to Comparative Example 3, separation/gelation was confirmed (the Table 1).

Explanation of the Reference Numerals

10 Material smaller in specific gravity
12 Filler
20 Material larger in specific gravity

The invention claimed is:

1. A puncture sealing agent comprising at least:
a rubber latex solution;
a short fiber; and
a clay based viscosity improver,
wherein the viscosity of the rubber latex solution after addition of the clay based viscosity improver thereto is from 3 to 6000 mPa·s in the range of +50 to −20° C., and
wherein a diameter (D) of the short fiber is in the range of: $5 \leq D \leq 30$ μm, and a length (L) of the short fiber is in the range of 2 mm to 7 mm.

2. The puncture sealing agent of claim 1, wherein the content of a solid component is 5 to 70 mass percent and the content of the short fiber is 0.1 to 5 mass percent.

3. The puncture sealing agent of claim 1 or 2, wherein a ratio (L/D) of a length (L) to a diameter (D) of the short fiber is in the range of $5 \leq L/D \leq 2000$.

4. The puncture sealing agent of claim 1 or 2, wherein the short fiber is obtained by compositing an inorganic filler with a material that is lower in specific gravity than the rubber latex solution.

5. The puncture sealing agent of claim 1 or 2, wherein the short fiber is made of a porous material that is higher in specific gravity than the rubber latex solution.

6. The puncture sealing agent of claim 1 or 2, wherein the short fiber is obtained by compositing a material lower in specific gravity than the rubber latex solution and a material higher in specific gravity than the rubber latex solution.

7. The puncture sealing agent of claim 6, wherein the short fiber has a multi-layered structure and the outermost layer thereof is made of a material higher in specific gravity than the rubber latex solution.

8. The puncture sealing agent of claim 1, wherein the short fiber is obtained by compositing an inorganic filler with a material that is lower in specific gravity than the rubber latex solution.

9. The puncture sealing agent of claim 3, wherein the short fiber is obtained by compositing an inorganic filler with a material that is lower in specific gravity than the rubber latex solution.

10. The puncture sealing agent of claim 1, wherein the short fiber is made of a porous material that is higher in specific gravity than the rubber latex solution.

11. The puncture sealing agent of claim 3, wherein the short fiber is made of a porous material that is higher in specific gravity than the rubber latex solution.

12. The puncture sealing agent of claim 1, wherein the short fiber is obtained by compositing a material lower in specific gravity than the rubber latex solution and a material higher in specific gravity than the rubber latex solution.

13. The puncture sealing agent of claim 3, wherein the short fiber is obtained by compositing a material lower in specific gravity than the rubber latex solution and a material higher in specific gravity than the rubber latex solution.

* * * * *